United States Patent [19]

Celis et al.

[11] Patent Number: 5,523,584

[45] Date of Patent: Jun. 4, 1996

[54] SUPPORTED OR SELF-SUPPORTING PHOTO STIMULABLE PHOSPHOR PANEL COMPRISING A VOLUME REFLECTION HOLOGRAM

[75] Inventors: Antoon Celis, Hove; Paul Leblans, Kontich; Philip Dooms, Edegem, all of Belgium

[73] Assignee: Agfa-Gevaert, N. V., Mortsel, Belgium

[21] Appl. No.: 360,090

[22] Filed: Dec. 20, 1994

[30] Foreign Application Priority Data

Feb. 4, 1994 [EP] European Pat. Off. .............. 94200311

[51] Int. Cl.$^6$ ................................................ G01N 23/04
[52] U.S. Cl. ..................... 250/584; 250/484.4; 250/586
[58] Field of Search ................................ 250/589, 484.4, 250/585, 586

[56] References Cited

U.S. PATENT DOCUMENTS 4,800,276   1/1989   Noguchi ..................... 250/586

Primary Examiner—Carolyn E. Fields
Attorney, Agent, or Firm—Breiner & Breiner

[57] ABSTRACT

A combination is provided comprising a supported or self supporting photostimulable phosphor panel, comprising a photostimulable phosphor layer, the phosphor being capable of storing energy upon irradiation with X-rays and of releasing the stored energy as stimulated emission light upon irradiation with stimulating light and collecting means for stimulated emission light, and showing a restricted angular aperture. The combination comprises a volume reflection hologram H1, situated between the phosphor panel and the light collecting means. The volume reflection hologram H1 reflects stimulated emission light entering the volume reflection hologram under any angle outside a restricted angle, determined by the angular aperture of the collecting means and transmits stimulated emission light entering the volume reflection hologram under the predetermined restricted angle.

19 Claims, 6 Drawing Sheets

SUPPORTED OR SELF-SUPPORTING PHOTO STIMULABLE PHOSPHOR PANEL COMPRISING A VOLUME REFLECTION HOLOGRAM

FIELD OF THE INVENTION

The present invention relates to a method for recording and reproducing a pattern of penetrating radiation.

BACKGROUND OF THE INVENTION

In radiography the interior of objects is reproduced by means of penetrating radiation, which is high energy radiation also known as ionizing radiation belonging to the class of X-rays, gamma-rays and high-energy elementary particle radiation, e.g. beta-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

More recently as described e.g. in U.S. Pat. No. 3,859,527 an X-ray recording system has been developed wherein photostimulable storage phosphors are used having in addition to their immediate light emission (prompt emission) on X-ray irradiation the property to store temporarily a large part of the absorbed X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals.

The basic constituents of such X-ray imaging system operating with a photostimulable storage phosphor are an imaging sensor containing said phosphor in particulate form normally in a plate or panel, which temporarily stores the X-ray energy pattern, a scanning laser beam for photostimulation, a photoelectronic light detector, detecting the light emitted (stimulated emission light) upon photostimulation, said light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube.

An X-ray recording system, be it a conventional system or a system based on photostimulable phosphor, needs to provide the diagnostician with clear, sharp images with as low as possible noise, i.e. the diagnostician wants images with high signal-to-noise ratio (SNR).

The light emitted by the photostimulable phosphor (stimulated emission light) upon stimulation diverges in all directions and accordingly, unless the collecting means for the stimulated emission light (usually comprising a light guiding means and a photodetector) has a very wide opening angle for collecting the stimulated emission light, a more or less large amount of said stimulated emission light is not collected by the photodetector. The amount of stimulated emission light that is collected by the collecting means constitutes the signal.

In the system, described above, there are two main causes of noise: the photodetector, comprised in the collecting means for stimulated emission light, emits (small) signals even when no stimulated emission light is collected, thus creating a signal that has no relation at all to the amount of stimulated emission light. This unwanted signal is called hereinafter inherent noise.

Said collecting means is, however, not only sensitive to the stimulated emission light, but also to the stimulating light. The signal coming from the unwanted detection of reflected stimulating light is also a noise factor (called hereinafter external noise). It is important that said collecting means collect only the stimulated emission light in order to achieve a high SNR (signal-to-noise ratio).

The external noise can be diminished, as disclosed in e.g. U.S. Pat. No. 4,535,238, U.S. Pat. No. 4,654,533, EP-A 532 800, by inserting a dichroic or holographic filter, which only transmits the stimulated emission light, before the collecting means for the stimulated emission light to prevent the reflected stimulating light from entering said collecting means.

Since the inherent noise depends on inherent characteristics of the photodetector, comprised in the collecting means for stimulated emission light, the most obvious way to enhance the SNR of the X-ray recording system, after the elimination of the external noise, is to increase the amount of stimulated emission light that is effectively collected by said collecting means.

The collection of stimulated emission light by said collecting means can be enhanced in various ways, e.g. by adapting the geometry of the stimulated emission light collection, or by adapting the composition of the panel carrying the photostimulable phosphor.

Examples of adapting the geometry of the stimulated emission light collection can be found in e.g. U.S. Pat. No. 4,346,295 where a special light guide member and the positioning of two such light guide members instead of one is disclosed. In EP-A 559 118 the use of a bifurcated bundle of optical fibers, comprising fibers to couple the stimulating light into the phosphor plate and fibers for collecting the stimulated emission radiation, is disclosed to increase the sensitivity and the specificity of the storage image plate scanner.

Examples of adapting the panel carrying the photostimulable phosphor to enhance the output of stimulated emission light can be found in e.g. FR 2,534,721 and U.S. Pat. No. 4,368,390 where it is disclosed to have a support that is reflective for the stimulated emission light by adding a white pigment to said support (FR 2,534,721) or having a reflective metal layer between the support and the phosphor layer (U.S. Pat. No. 4,368,390).

Another way to enhance the amount of stimulated emission light that emerges from the phosphor plate is to add multilayer optical filters to the phosphor plate to increase the efficiency of utilization of the stimulating light (U.S. Pat. No. 4,931,642)

Still other documents, e.g. U.S. Pat. No. 5,066,864, U.S. Pat. No. 4,394,581, U.S. Pat. No. 4,380,702, disclose means to achieve high reflection of stimulated emission light together with high transmittance or absorbance of the stimulating rays.

In U.S. Pat. No. 4,800,276 it is disclosed to use a lens (either conventional or holographic) to converge the stimulated emission light into the stimulated emission light collector and to prevent the afterglow emission light from reaching said stimulated emission light collector.

Each of the proposed solutions to enhance the amount of stimulated emission light that reaches the collector for said stimulated emission light have their own merits but also their own drawbacks. Some solutions influence negatively the resolution of the system, others bring about geometrical or mechanical problems.

There is still a need for means to enhance the amount of stimulated emission light that is effectively recorded by the collecting means for said stimulated emission light but that diminishes the negative influence of the earlier disclosures on the resolution of the system and diminishes also possible problems with the geometry of the scanning means.

OBJECT AND SUMMARY OF THE INVENTION

It is an object of the invention to provide, in radiographic systems based on photostimulable phosphor panels, means for augmenting the amount of stimulated emission light emerging from said stimulable phosphor panel within the opening angle of collecting means for said stimulated emission light.

It is another object of the invention to provide a photostimulable phosphor panel with which it is possible to enhance the amount of stimulated emission light that is effectively collected by the collecting means for said stimulated emission light.

It is still another object of the invention to provide a photostimulable phosphor panel, with which it is possible to enhance the amount of stimulated emission light that is effectively collected by the collecting means for said stimulated emission light, without a negative influence on the modulation transfer function of said panel.

It is further object of the invention to provide means for enhancing, in radiographic systems based on photostimulable phosphor screens, the amount of stimulated emission light that is effectively collected by the collecting means for said stimulated emission light, said means for enhancing the amount of stimulated emission light that is effectively collected by said collecting means not necessitating a special geometry for said light collecting means.

Other objects and advantages of the present invention will become evident from the description hereinafter.

The objects of the present invention are realized by providing a combination comprising (i) a supported or self supporting photostimulable phosphor panel, comprising a photostimulable phosphor layer, said phosphor being capable of storing energy upon irradiation with X-rays and of releasing said stored energy as stimulated emission light upon irradiation with stimulating light and (ii) collecting means for stimulated emission light, showing a restricted angular aperture characterised in that (i) said combination further comprises a volume reflection hologram H1, situated between said phosphor panel and said light collecting means and (ii) said volume reflection hologram H1 reflects stimulated emission light entering said volume reflection hologram under any angle outside a restricted angle, determined by the angular aperture of the collecting means and transmits stimulated emission light entering said volume reflection hologram under said predetermined restricted angle.

In a preferred embodiment said volume reflection hologram H1 is situated at a distance of said phosphor panel of at most 2 mm, more preferably at most 200 µm.

In a further preferred embodiment said volume reflection hologram H1 forms an integral part of said phosphor panel.

In a preferred embodiment the objects of the invention are realized by providing a photostimulable phosphor panel comprising following layers in consecutive order (i) a support capable of absorbing stimulating light, (ii) a volume reflection hologram (H2) reflecting stimulated emission light entering said volume reflection hologram under any angle and transmitting stimulating light entering said volume reflection hologram under any angle, (iii) a stimulable phosphor layer, (iv) a volume reflection hologram H1 reflecting stimulated emission light entering said volume reflection hologram under any angle outside a restricted angle, determined by the angular aperture of light collecting means for stimulated emission light and transmitting stimulated emission light entering said volume reflection hologram under said predetermined restricted angel.

DETAILED DESCRIPTION OF THE INVENTION

Hereinafter the wording "volume reflection hologram" means a single volume reflection grating recorded in one sheet of recording material, or multiple volume reflection gratings recorded in one sheet of recording material, or a stack of two or more sheets of recording material, each having recorded therein a single or multiple volume reflection grating.

Figure 1:
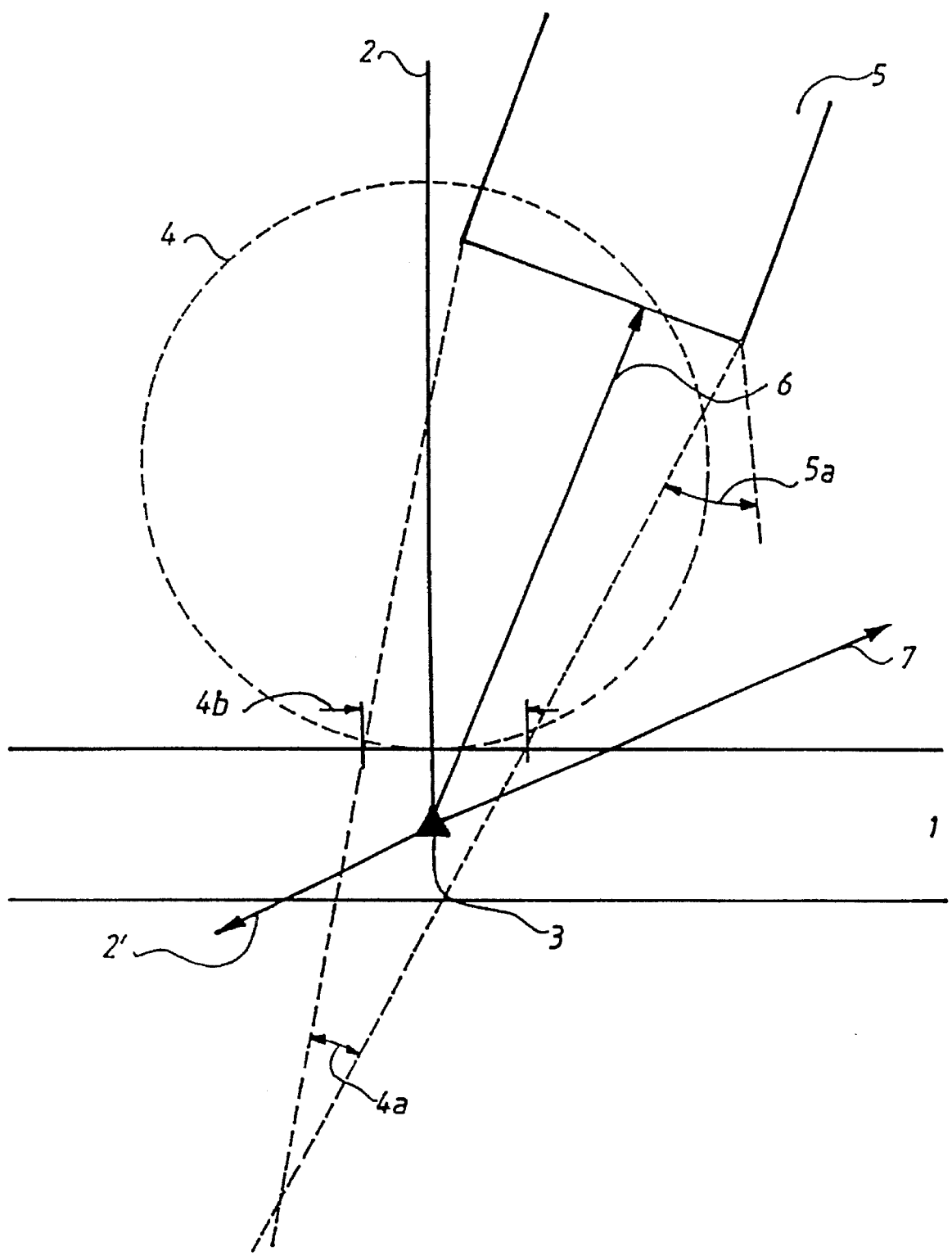
FIG. 1 is a simplified and magnified cross section, not on scale, through a photostimulable phosphor layer when no hologram according to the present invention is present and the stimulated emission light is captured by one detector.
Figure 2:
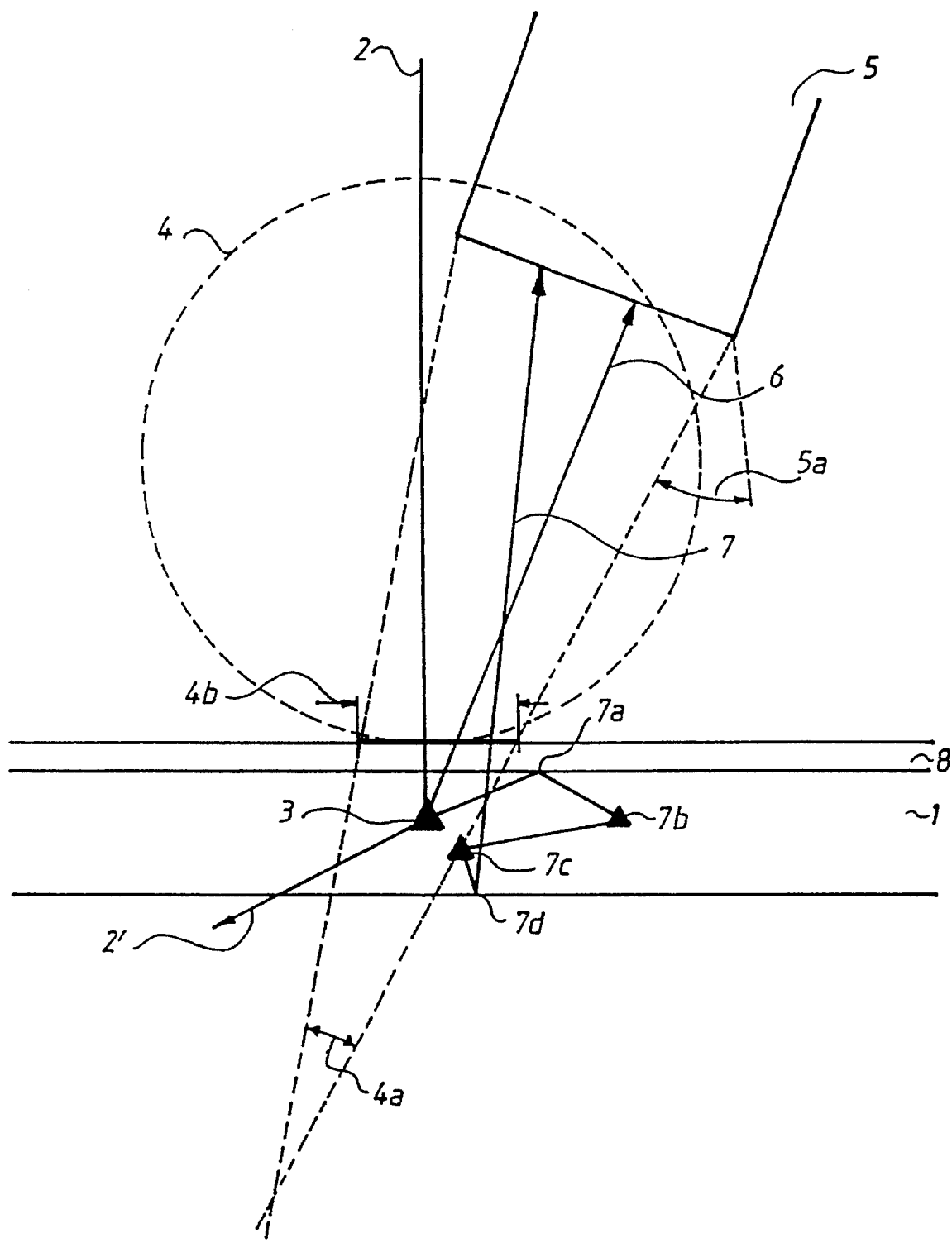
FIG. 2 is the same as FIG. 1 except for the fact that a volume reflection hologram, H1, according to the present invention is present.
Figure 3:
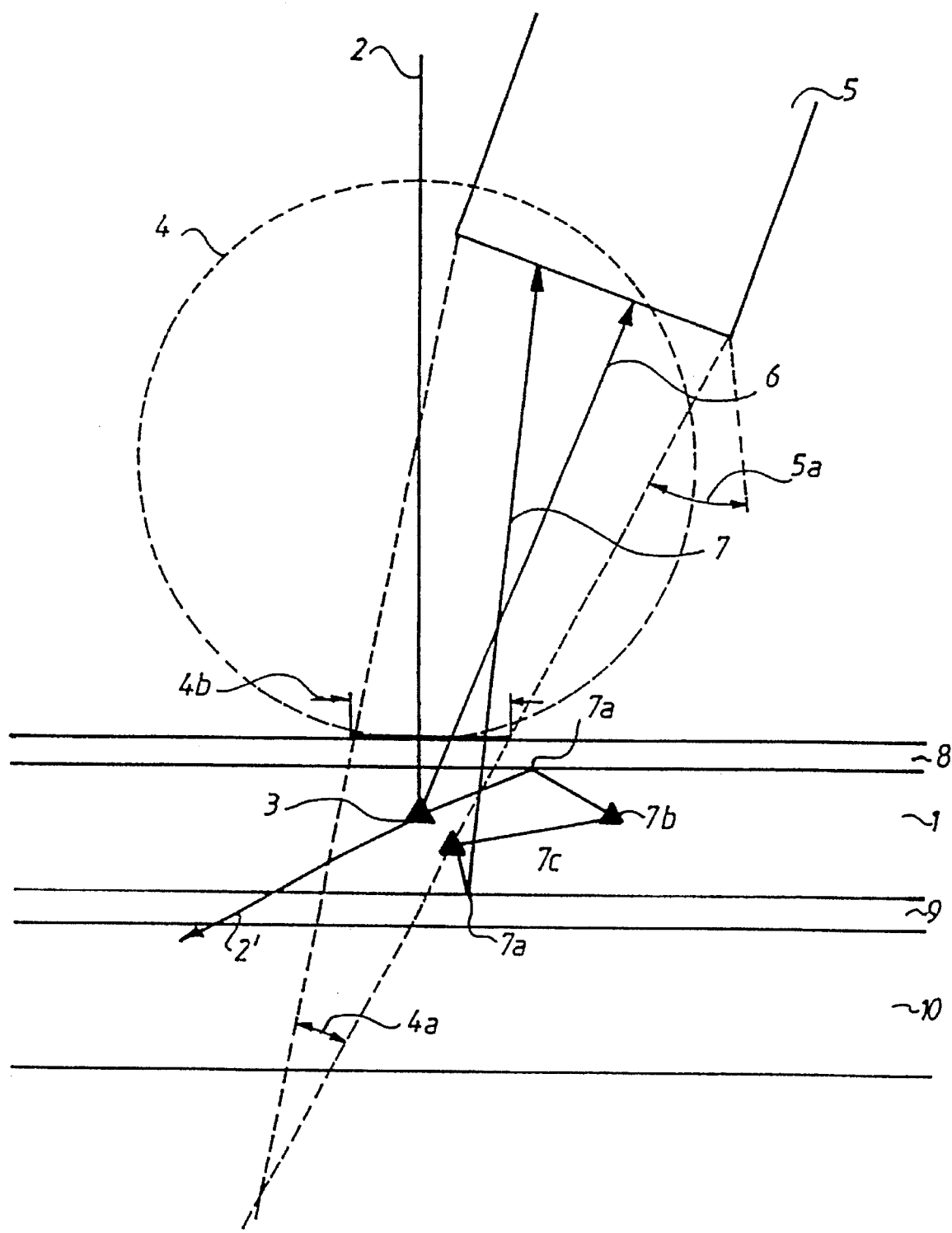
FIG. 3 is a simplified and magnified cross section, not on scale, through a photostimulable phosphor layer when said photostimulable phosphor is coated on a support capable of absorbing stimulating light and a volume reflection hologram, H1, according to the present invention is present on the surface of said photostimulable phosphor, facing the stimulating rays and a volume reflection hologram, H2, according to the present invention is interposed between said support and said photostimulable phosphor and the stimulated emission light is captured by one detector.

In FIG. 1 the collection of stimulated emission light, when no volume reflection hologram, H1, according to the present invention is present is illustrated. When a stimulating ray (2) impinges on a photostimulable phosphor layer (1), that previously had been exposed to a pattern of radiation, a phosphor particle (3) emits the stored energy as stimulated emission light in all directions. Due to multiple scattering within the stimulable phosphor layer (1) any point on the surface of said photostimulable phosphor layer will emit light in all directions (i.e. as a sphere); i.e. each point behaves as a quasi Lambertian radiator. In the cross sectional view of FIG. 1 this sphere is visualized by circle (4) and extends above the surface of said photostimulable phosphor layer (1). Due to the restricted opening angle (4a) and a definite angular aperture (5a) of the light collecting means (5) only the light emerging in a small section of said sphere (4) extending above the surface of said photostimulable phosphor layer is captured. This means that only the stimulated emission light emitted by said phosphor particle (3) within an angle (4a). This angle 4a is, in connection with the angular aperture (5a) of the collecting means (5) for stimulated emission light, the predetermined restricted angle under which said light collecting means (5) can see the stimulated emission light, escaping from said photostimulable phosphor layer via surface 4b. Only stimulated emission light emerging from the surface 4b of the photostimulable layer 1 within the angle 4a (in FIG. 1 only one ray is represented by ray 6) is collected by said light collecting means (5), whereas the rest of the stimulated emission light (in FIG. 1 only one ray is represented by ray 7) is not detected. The ray marked 2' in FIG. 1 is that part of the stimulating ray 2 that escapes from the photostimulable phosphor layer 1:

In FIG. 2 the operation of a volume reflection hologram, hereinafter called H1, according to the present invention, fixed on one side of a photostimulable phosphor layer is illustrated. The volume reflection hologram, H1, (8) is construed such as to be transparent for the stimulated emission light only within the angle (4a), which in connection with the angular aperture (5a) of said collecting means (5) is also the angle under which light collecting means (5) can collect the stimulated emission light, escaping from said photostimulable phosphor layer via surface 4b (i.e. the opening angle of said collecting means). Said volume reflection hologram, H1, has a transparency, preferably of at least 80%, for the stimulating rays (2) entering said volume reflection hologram within angle 4a and is fixed on one side of the photostimulable phosphor layer (1), facing the stimulating rays and the light collecting means 5. When a stimulating ray (2) impinges on a photostimulable phosphor layer (1), that previously had been exposed to a pattern of radiation, a phosphor particle (3) emits the stored energy as stimulated emission light in all directions, i.e. in a sphere. Due to the presence of said volume reflection hologram, H1, (8) said stimulated emission light released by the phosphor particle (3) can only leave said stimulable phophor layer (1) within angle 4a, which in connection with the angular aperture (5a) of said collecting means (5) is also the predetermined restricted angle under which light collecting means (5) can collect said stimulated emission light (ray 6), escaping from said photostimulable phosphor layer via surface 4b. Preferably at least 80% of the stimulated emission light reaching the interface between said photostimulable phosphor layer (1) and said volume reflection hologram H1 under any angle outside angle 4a are reflected back into said photostimulable phosphor layer (1). Due to multiple scattering, a (large) part of the photons of said stimulated emission light that has been reflected back into said photostimulable phosphor layer, reach again the interface between said photostimulable phosphor layer and said volume reflection hologram H1 under an angle which is within angle 4a, and thus is collected by said collecting means 5 for said stimulated emission light. The ray, designated by 7 in FIG. 3, illustrates a possible fate of a photon of stimulated emission light that is reflected back in said photostimulable phosphor layer: ray 7 is reflected in point 7a by said volume reflection hologram, H1; on its way it encounters phosphor particle 7b and is deflected towards phosphor particle 7c, then it is deflected to the other side (bottom side) of said photostimulable phosphor layer; from said bottom side, in point 7d, it is reflected back into said photostimulable phosphor layer but now under such an angle that it reaches the interface between said photostimulable phophor layer and said volume reflection hologram H1 under an angle within angle 4a and is thus collected by said collecting means 5 for the stimulated emission light. The ray marked 2' in the FIG. 2 is that part of the stimulating ray 2 that escapes from the photostimulable phosphor layer 1.

The net result of having a volume reflection hologram, H1, according to the present invention fixed on one side of a photostimulable phosphor layer is that in the totality less stimulated emission light leaves said photostimulable phosphor layer, but that more stimulated emission light leaves said photostimulable phosphor layer under such an angle that it is collected by the collecting means for said stimulated emission light.

In FIG. 3 the operation of a stimulable phosphor layer, comprising a volume reflection hologram, H1, as shown in FIG. 2, said phosphor layer being coated on a black support (10) and having a volume reflection hologram, H2, (9) interposed between said support and said stimulable phosphor layer, is shown. The volume reflection hologram, H2, (9) is construed so as to reflect, independently of the angle of incidence, preferably at least 80, more preferably at least 90% of the stimulated emission light, arriving at the interface between said stimulable phosphor layer and said volume reflection hologram H2 and to transmit, independently of the angle of incidence, preferably at least 80, more preferably 90% of the stimulating light arriving at the interface mentioned above.

The operation is analogous to the one described in FIG. 2, except for the fact that said volume reflection hologram, H2, (9) enhances the reflection of stimulated emission light in point 7d in such a way that e.g. at least 80% of said stimulated emission light is reflected back in said stimulable phosphor layer. The volume reflection hologram, H2 (9), having a transparency of e.g. at least 80% for stimulating light, makes it possible for the stimulating light 2' that does not interact with a phophor particle to reach said black support (10), where it is absorbed. In this way there is more stimulated emission light available in said stimulable phosphor layer that due to multiple scattering can reach the interface of said photostimulable phosphor layer and said volume reflection hologram H1 again under an angle which is within angle 4a, and thus escapes from said photostimulable phosphor layer via surface 4b and is collected by said collecting means 5 for said stimulated emission light.

In this way both the amount of stimulated emission light that leaves said photostimulable phosphor layer under such an angle that it is collected by the collecting means for said stimulated emission light is enhanced and the possible external noise caused by the unwanted detection by said collector means of reflected stimulating light is diminished.

It is possible to have, instead of a black support (10), a support that is capable of absorbing the wavelength of the stimulating light (2). In another embodiment of the invention it is possible, instead of having a support (10) capable of absorbing the wavelength of the stimulating light (2) or in addition to said support, to have the volume reflection hologram H2 (9) to absorb the wavelenght of stimulating light (2) by adding a suitable dye or pigment to said volume reflection hologram H2. Suitable dyes or pigment are e.g. those well known in the art of photography. Non limitative examples can be found in e.g. BE 835089, BE 850162, GB 393,844, U.S. Pat. No. 3,594,171, U.S. Pat. No. 4,923,788, EP-A 457153 etc.

Using a stimulable phosphor panel, where only H2 is present and one or more of the measures cited above are taken to prevent reflection of stimulating light, provides a higher speed without loss in sharpness:more stimulated emission light reaches the surface of said phosphor panel facing said collecting means for said stimulated emission light, and the stimulating light is absorbed.

Figure 4:
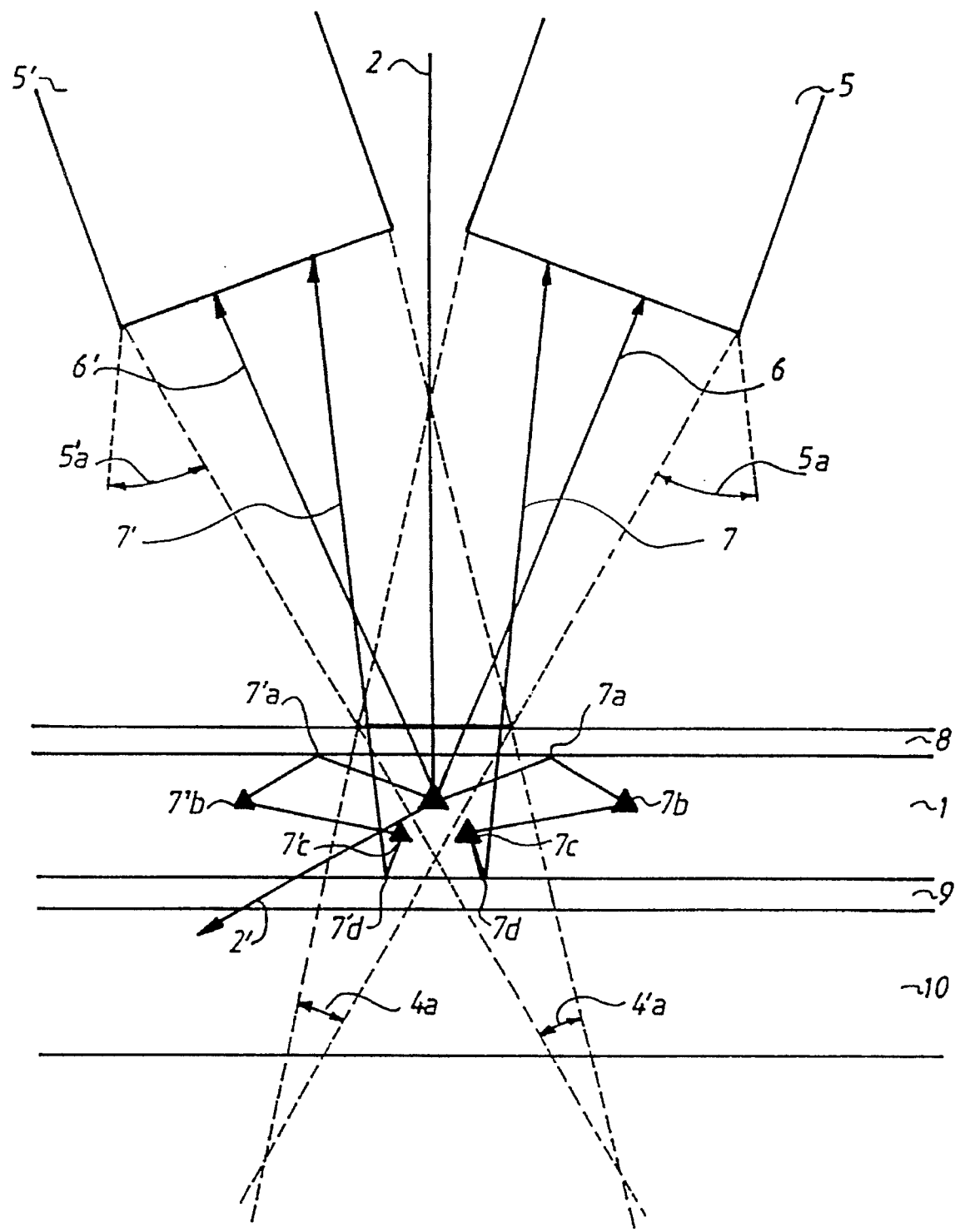
FIG. 4 is equal to FIG. 3 except for the fact that the stimulated emission light is captured by two detectors.
Figure 5:
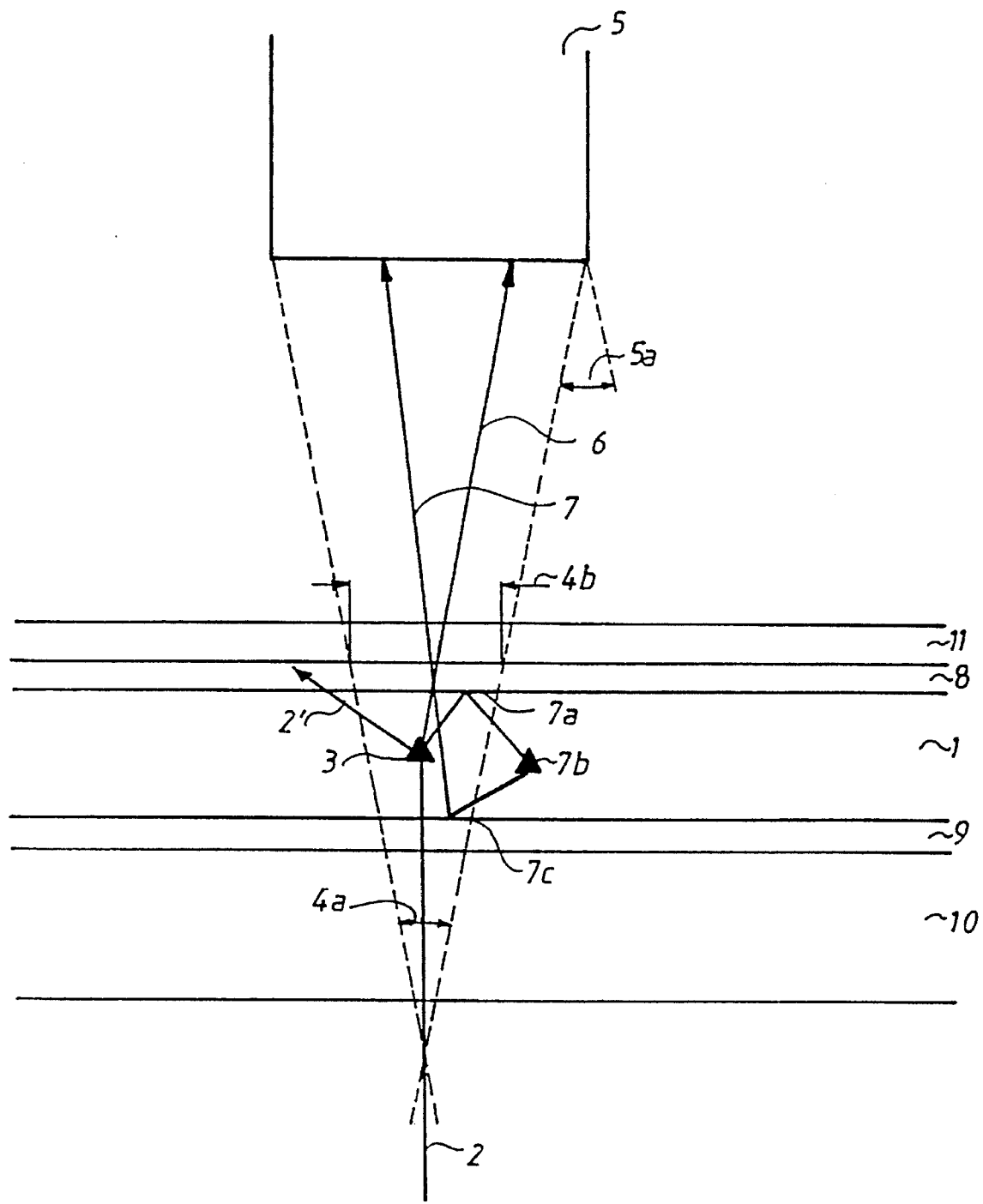
FIG. 5 is a simplified and magnified cross section, not on scale, through a photostimulable phosphor layer on a transparent support and a volume reflection hologram, H1, according to the present invention is present on the surface of said photostimulable phosphor, facing away from the stimulating rays and a volume reflection hologram, H2, according to the present invention is interposed between said transparent support and said photostimulable phosphor, while said support and volume reflection hologram H2 face the stimulating rays, and the stimulated emission light is captured by one detector.

FIG. 4, is analogous to FIG. 3, except for the presence of a second light collecting means 5' in a symmetrical position with respect to light collecting means 5. The volume reflection hologram H1 (8) is construed so a to be transparent both for the stimulated emission light entering said volume reflection hologram H1 (8) under both angle 4a, which in connection with the angular aperture 5a of the light collecting means 5 is the predetermined restricted angle under which light collecting means 5 can collect said stimulated emission light and angle 4'a, which in connection with the angular aperture 5'a of the light collecting means 5' is the predetermined restricted angle under which light collecting means 5' can collect said stimulated emission light. The light collecting means 5 and 5' can be the same or different. In FIG. 5, circle 4 is omitted, and the rays of stimulated emission light being captured by collecting means 5' are numbered 6' and 7' respectively.

It is evident that it is also possible to have two collecting means 5 and 5' in the embodiment according to FIG. 2.

In FIG. 5 the stimulable phosphor layer and the volume reflection holograms H1 (8) and H2 (9) are applied to a support (10), which is transparent for the stimulating light. The stimulating rays (2) enter the stimulable phosphor layer from the side opposite to the position of the collecting means 5. The stimulating rays enter the assembly via volume reflection hologram H2 (9). Said volume reflection hologram H2 (9) has again to be reflective for the stimulated emission light entering said volume reflection hologram H2 (9) under any angle and transparent for the stimulating light entering said volume reflection hologram H2 (9) under any angle. Volume reflection hologram H1 (8) is transparent for the stimulated emission light within the angle (4a), which in connection with the angular aperture (5a) of said collecting means (5) is also the predetermined restricted angle under which light collecting means (5) can collect the stimulated emission light, escaping from said photostimulable phosphor layer via surface 4b (i.e. the opening angle of said collecting means) and reflective, for at least 80%, for said stimulated emission light entering said volume reflection hologram H1 under any other angle; said volume reflection hologram H1 is reflective, for at least 80% for the stimulating light 2, such as to prevent said stimulating light 2 from entering directly said light collecting means 5. Using the photostimulable phosphor sheet, according to the present invention in the configuration shown in FIG. 5, it is preferred that the photostimulable phosphor sheet carries on top of volume reflection hologram H1 (8) a dyed layer absorbing the stimulating light, but transmitting the stimulated emission light. This layer can be dyed with any dye or pigment (dispersion) and the spectral absorbance of said dye or pigment (dispersion) is adapted to the wavelength of the stimulating light. Examples of suitable dyes or pigments have been given above.

In this embodiment the transparent support can either be facing said collecting means (5) or be farthest away from said collecting means (5).

The Volume Reflection Hologram, H1 or H2

Volume reflection holograms, useful in accordance with the present invention, are produced by exposing a photosensitive material to an interference pattern produced between two beams of coherent light. Producing a volume reflection hologram demands that both beams enter a thick (several µm) recording medium via opposite sides. Particulars of recording holograms can be found in e.g. G. Saxby Manual of Practical Holography Focal Press 1991, P. Hariharan, Optical Holography, Cambridge University Press 1984, R. J. Collier, C. B. Burckhardt and L. H. Lin in Optical Holography, Academic Press NY 1971.

Figure 6:
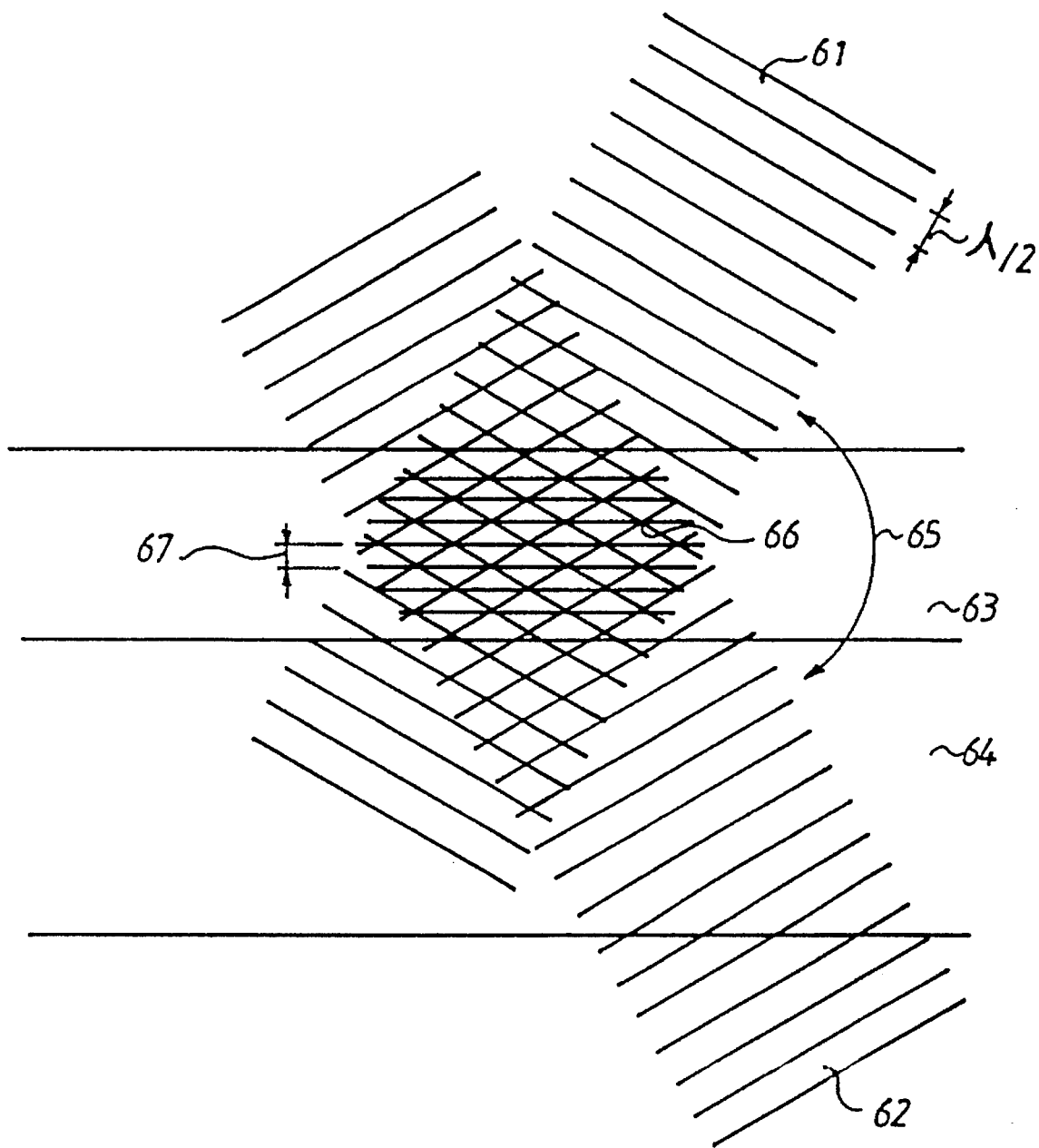
FIG. 6 illustrates, in a simplified and magnified way, a possible mode of producing a volume reflection hologram, H1, useful in the present invention.

In FIG. 6 a possible mode of recording a volume reflection hologram is illustrated. Two beams of coherent light (61, 62), with a given wavelength, provided by a laser, enter the thick photosensitive layer (63) via opposite sides, i.e. one beam of coherent light (61) enters said thick photosensitive layer (63) directly and the other beam of coherent light (62) enters said thick photosensitive layer (63) via the support (64) of said thick photsensitive layer. Both beams of coherent light form an angle (65) between each other. Within said thick photosensitive layer (63) an interference pattern (66), consisting of interference fringes (67), between the two beams of coherent light (61, 62) is formed and recorded. The angle (65) between the two beams of coherent light (61, 62) determines the distance (67) between the interference fringes forming the interference pattern 66. The distance 67 between the interference fringes fulfils the Bragg-law:

$$d = \frac{\lambda}{2 \cos \alpha}$$

wherein λ stand for the wavelength of the beams of coherent light that are used to produce the volume reflection hologram, H1 or H2, and α stands for half the angle 65.

For making a volume reflection hologram, H1 or H2, used according to the present invention it is preferred that said two beams of coherent light (61, 62) are parallel beams. It is easier to produce a volume reflection hologram, H1 or H2, for use according to the present invention if wavelength of said beams (61,62) is exactly the same as the wavelengths that have to be reflected or transmitted by the said hologram. It is however possible to use any laser, known in the art e.g. He-Ne, Kr, Ar, NdYAG, frequency doubled NdYAG, frequency tripled NdYAG, He-Cd lasers etc, to produce a volume reflection hologram, H1 or H2, for use according to the present invention when the angle (65) is adapted so as to give a distance (67) between the interferences fringes that fulfills the Bragg-law for the wavelength that has to be reflected by said volume reflection hologram. It is clear that a volume reflection hologram, H1, for use according to the present invention shall have as high reflectivity as possible for light reaching the interface between the phosphor layer and said volume reflection hologram, H1, under any angle outside angle 4a of FIG. 2. This means that the hologram must have a high diffraction efficiency. By diffraction efficiency (DE) is to be understood that percentage of light that, in the case of a volume reflection hologram, is reflected out of the total amount of light that strikes said volume reflection hologram under a predetermined angle. A volume reflection hologram, H1, for use according to the present invention, shall show a diffraction efficiency, DE$\geq$80% for the light entering said volume reflection hologram under any angle outside the angle 4a of FIG. 2. A DE$\geq$90% is preferred, most preferably said volume reflection hologram, H1, shall show DE$\geq$95% for light entering said volume reflection hologram, H1, under any angle outside the angle 4a of FIG. 2. For stimulated emission light arriving at the interface between the phosphor layer and said volume reflection hologram, H1, under any angle within the angle 4a of FIG. 2, said volume reflection hologram, H1, shall have a transparency of at least 80%, preferably said transparency shall be at least 90%, and most preferably at least 95%.

The volume reflection hologram, H2, for use according the present invention shall have, independently of the angle of incidence of said stimulated emission light, a diffraction efficiency, DE$\geq$80 %, preferably $\geq$90% for the stimulated emission light arriving at the interface of the phosphor layer and said volume reflection hologram H2. It shall have a transmittance for the stimulating light equal or greater than 80%, preferably greater than 90%.

Both H1 and H2, for use in the present invention, must be very broad band reflection holograms, i.e. must reflect the stimulated emission light even if said emission light enters said holograms under widely varying angles. This means that in the finished hologram the interference fringes (FIG. 6, number 67) may not be equally spaced, but that groups of interference fringes, each having an own spacing, are preferably present. This may be achieved in one sheet of a recording medium for said holograms by adapting the processing with respect to willful uneven swelling or shrinking of the photosensitive recording layer. Recording of multiple gratings in one sheet of recording medium, as described in R. R. A. Syms, Practical Volume Holography, Clarendon Press Oxford 1990 (chapter 7, p 194 ss) is another way to construct a broad band hologram, useful in the present invention, in a single sheet of a recording medium. It is also possible to achieve broad band reflection holograms, useful in the present invention, by superimposing several volume reflection holograms, recorded in different sheets of the recording medium, each of these holograms having a different spacing of the interference fringes.

The volume reflection holograms, H1 or H2, for use in the present invention, can be produced in any photosensitive medium known in the art of holography. Suitable recording media for a volume reflection hologram, H1 or H2, for use according to the present invention are photopolymers, as described in e.g. U.S. Pat. No. 4,696,876, U.S. Pat. No. 4,588,664, WO 85/001127, EP-A 407772, photoresists as disclosed in e.g. EP-A 168 179, U.S. Pat. No. 3,925,077, U.S. Pat. No. 4,343,874. A preferred recording medium for a volume reflection hologram, H1, useful in the present invention is dichromated gelatine as disclosed in e.g. FR 2,492,997, U.S. Pat. No. 3,963,490, JP 90/041755, EP-A 043 993 etc. In a most preferred embodiment a silver halide material comprising a gelatine binder and silver halide crystals with a diameter $\leq$100 nm, such as e.g. HOLOTEST 8E56 HD or HOLOTEST 8E75 HD (Holotest is a trademark of Agfa-Gevaert NV, Mortsel, Belgium) are used as recording medium for a volume reflection hologram, H1, to be used in the present invention. A comprehensive review of silver halide materials for holography can be found in H. I. Bjelkhagen, Silver-Halide Recording Materials for Holography and Their Processing, Springer Verlag New York 1993.

A useful processing sequence for volume reflection hologram, H1 or H2 for use according to the present invention recorded on HOLOTEST 8E75 HD (Holotest is a trademark of Agfa-Gevaert NV, Mortsel, Belgium) can be found in Optical Engineering Vol. 32 No 9 p 2233 ss (1993).

When using one of said silver halide materials as the recording medium for a volume reflection hologram, H1 or H2, to be used in the present invention, a processing method comprising following steps, is preferably used:

(i) Development : After exposure said silver halide material is developed in a developer. This developer can contain any suitable developing agent e.g. hydroquinone, N-methyl-p-aminophenol-sulfate, pyrogallol, pyrocathechine, etc. A preferred developing agent for use according to the present invention is ascorbic acid. The pH of said developer is adjusted to a value between 9 and 12. Said developer may contain additives known in the art as e.g. fog preventing agents, anti-oxidantia, etc. It is preferred that the developer used in the production of a volume reflection hologram, H1 or H2, used according to the present invention contains little or no sulfite ions.

(ii) Bleaching: After development the silver halide material is rinsed in water and after rinsing, the metallic silver, formed during development is bleached. This bleaching can proceed through any bleach solution known in the art of making holograms. Useful bleach baths for use in the production of volume reflection hologram, H1 or H2, used according to the present invention, are disclosed in e.g. EP-A 207 001, EP-A 272 218, EP-A 272 219, JP 87/033579, Photogr. Sci. Eng volume 24, p 108 (1980), Appl. Opt. volume 8, p 2479 (1969), etc. It is however preferred to use a bleaching bath based on dichromate ions.

(iii) Fixing: after bleaching the silver halide material is fixed. As fixing bath any fixing bath based on thiosulfate ions can be used.

(iv) Rinsing and dehydrating: after fixing the silver halide material is rinsed in water and dehydrated in a alcohol solution. Preferably said alcohol solution is based on isopropyl alcohol.

It is preferred to introduce also a enzyme containing bath in the development sequence, described above. Said enzyme containing bath adjusts the thickness of the gelatine layer in the finished volume reflection hologram, H1 or H2, for use according to the present invention, to the thickness needed to have a high diffraction efficiency.

The thickness of the emulsion can be corrected (by swelling or shrinking) to bring about the desired spacing of interference fringes by means described in chapter 8 of the cited book by H. I. Bjelkhagen on p 297.

The photosensitive material used to produce a volume reflection hologram, H1 or H2, for use according to the present invention may comprise any transparent support. Useful supports for said photosensitive material are those well know in the manufacture of photographic films including, cellulose triacetate, cellulose acetate propionate or cellulose acetate butyrate, polyesters such as poly(ethyleneterephthalate), polyamides, polycarbonates, polyimides, polyolefins, poly(vinylacetals), polyethers and polysulfonamides.

Cellulose triacetate is the preferred support for the photosensitive material used to produce a volume reflection hologram, H1 or H2, for use according to the present invention. The thickness of said cellulose triacetate support is between 100 and 200 μm.

The photosensitive material used to produce a volume reflection hologram, H1 or H2, for use according to the present invention may comprise a temporary support, from which said hologram can be transferred to the stimulable phosphor layer of the present invention.

The Photostimulable Phosphors

Examples of the stimulable phosphor employable in the radiation image storage panel of the present invention include:

SrS:Ce, Sm, SrS:Eu, Sm, ThO$_2$:Er, and La$_2$O$_2$S:Eu, Sm, as described in U.S. Pat. No. 3,859,527;

ZnS: Cu, Pb, BaO.xAl$_2$O$_3$: Eu, in which x is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

M$^{III}$OX:xCe, in which M$^{III}$ is at least one trivalent metal selected from the group consisting of Pr, Nd, Pm, Sm, Eu, Tb, Dy, Ho, Er, Tm, Yb and Bi; X is at least one element selected from the group consisting of Cl and Br; and x is a number satisfying the condition of $0<x<0.1$, as described in Japanese Patent Provisional Publication No. 58 (1983) -69281;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

(Ba$_{1-x}$, M$^{II}_x$)FX:yA, in which M$^{II}$ is at least one divalent metal selected from the group consisting of Mg, Ca, St, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$ respectively, as described in U.S. Pat. No. 4,239,968.

Bariumfluorohalide phosphors as disclosed in, e.g., U.S. Pat. No. 4,239,968, DE OS 2 928 245, U.S. Pat. No. 4,261,854, U.S. Pat. No. 4,539,138, U.S. Pat. No. 4,512,911, EP 0 029 963, U.S. Pat. No. 4,336,154, U.S. Pat. No. 5,077,144, U.S. Pat. No. 4,948,696, Japanese Patent Provisional Publication No. 55(1980)-12143, Japanese Patent Provisional Publication No. 56(1981)-116777, Japanese Patent Provisional Publication No. 57(1982)-23675, U.S. Pat. No. 5,089,170, U.S. Pat. No. 4,532,071, DE OS 3 304 216, EP 0 142 734, EP 0 144 772, U.S. Pat. No. 4,587,036, U.S. Pat. No. 4,608,190, and EP 0 295 522.

Ba$_{1-x}$Sr$_x$F$_{2-a-b}$X$_b$:zA, wherein X is at least one member selected from the group consisting of Cl and I; x is in the range $0.10 \leq x \leq 0.55$; a is in the range $0.70 \leq a \leq 0.96$; b is in the range $0 \leq b \leq 0.15$; z is in the range $10^{-7} \leq z \leq 0.15$, and A is Eu$^{2+}$ or Eu$^{2+}$ together with one or more of the co-dopants selected from the group consisting of Eu$^{3+}$, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine, as disclosed in EP 345 903.

Alkali metal phosphors comprising earth alkali metals as disclosed in e.g. U.S. Pat. No. 5,028,509 and EP 0 252 991.

Halosilicate phosphors as disclosed in, e.g.,EP 304 121, EP 382 295 and EP 522 619.

The above-described stimulable phosphors are given by no means to restrict the stimulable phosphor employable in the present invention. Any other phosphor can be also employed, provided that the phosphor gives stimulated emission when excited with stimulating rays after exposure to a high energy radiation.

The Photostimulable Phosphor Layer

For use in the method according to the present invention the stimulable phosphor is used preferably dispersed in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl(meth) acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof. Also binders substantially consisting of one or more rubbery and/or elastomeric polymers are useful as binder for the stimulable phosphor layer according to the present invention. Most suitable thermoplastic rubbers, used as block-copolymeric binders for a stimulable phosphor layer in accordance with this invention are the KRATON-G rubbers, KRATON being a trade mark name from SHELL. KRATON-G thermoplastic rubber polymers are a unique class of rubbers designed for use without vulcanisation.

It is preferable that a minimum amount of binder be employed to obtain a high X-ray energy absorption. However, a very small amount of binding agent may result in a too brittle layer, so a compromise has to be made. So the ratio by volume of phosphor to binder is preferably at least 70:30 and at most 92:8 and the packing ratio is less than 67%.

The coverage of the phosphor is preferably in the range from about 300 to 1500 g/m$^2$.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Further are mentioned glass supports and metal supports. The thickness of the phosphor layer is preferably in the range of 0.05 to 0.5 mm.

The choice of a support for a stimulable phosphor layer, to be used according to the present invention, is largely determined by the intended embodiment of the present invention: in the embodiment illustrated in FIGS. 3 and 4, an opaque, or black or dyed support will be chosen, in the embodiment illustrated in FIG. 5, a transparent support will be chosen.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm$^3$ of dry coating).

Optionally, a layer, reflecting the stimulated emission light, is provided between the phosphor-containing layer and its support to enhance the output of light emitted by photostimulation. Such a layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

In the present invention the use of such a layer, reflecting the stimulated emission light, is preferably used when no volume reflection hologram H2 is present. When a volume reflection hologram H2, according to the present invention, is present, the stimulated emission light is reflected by said hologram H2.

In order to improve resolution it is possible to provide underneath the phosphor layer a layer absorbing the stimulating light e.g. a carbon black containing layer or to use a coloured support e.g. a grey or black film support.

It is preferred to coat the stimulable phosphor layer according to the present invention on to a support capable of absorbing the stimulating light and to interpose between said support and said stimulable phosphor layer a volume reflection hologram, H2, that, independently of the angle of incidence of the stimulated emission light, reflects preferably at least 80, more preferably at least 90% of the stimulated emission light and has, independently of the angle of incidence a transmittance of preferably at least 80, more preferably at least 90%, for the stimulating light.

Applying the Volume Reflection Hologram, H1, to the Photostimulable Phosphor Layer, or H2 to the Support Although it is possible to use a volume reflection hologram, H1, according to the present invention mounted anywhere between the photostimulable phosphor layer and the collecting means for the stimulated emission light, it is preferred to mount said volume reflection hologram H1, as close as possible to said photostimulable phosphor layer. In a most preferred embodiment said volume reflection hologram, H1, is applied to one side of said phosphor layer in such a way the said hologram H1 forms an integral part of said photostimulable phosphor layer. Said volume reflection hologram, H1, can e.g. be laminated onto said photostimulable layer by an adhesive, preferably a thermo-adhesive, that is applied to said volume reflection hologram, H1, and forms an adhesive layer thereon. Although it is possible to coat an adhesive layer directly onto said volume reflection hologram, H1, said adhesive layer is preferably laminated on said volume reflection hologram, H1, from an intermediate substrate (e.g. a siliconised polyester film), on which it was coated first. Suitable thermo adhesive polymers are, either alone or in mixture, those chosen from e.g. co(styrene-butylacrylate-methacrylic acid), co(styrene-butylmethacrylate-methacrylic acid), co(vinylidenechloride-methacrylate-itaconicacid), co(methylmethacrylate-butadiene-itaconic acid), polyvinyl-acetate, co(vinylacetate-ethylene), co(n-.butylmethacrylate-i-butyl-methacrylate), poly-n.butylmethacrylate, poly-i.butylmethacrylate, co(methylmethacrylate-ethylacrylate), co(vinylacetate-vinyllaurate), co(vinylacetate-vinyllaurate-itaconic acid).

The adhesive layer in a most preferred embodiment comprises co(vinylacetate-vinyllaurate) in a concentration ranging from 5 to 30 g/m$^2$, with a relative ratio of vinylacetate/vinyllaurate between 100/0% and 70/30%, still more preferably at about 80/20%.

The volume reflection hologram, H2, for use according to the present invention, can be applied to the support of the photostimulable phosphor layer in the same way as H1. The photostimulable phosphor layer can, when said volume reflection hologram, H2, has been laminated onto said support be coated on top of said volume reflection hologram, H2 as described above.

It can be advantageous that after laminating a volume reflection hologram for use according to the present invention on a photostimulable phosphor panel the support of said volume reflection hologams can be stripped away. Therefore the recording medium for the volume reflection holograms to be used according to the present invention are preferably coated on a temporary support. Said temporary support can be any of the supports known in the art of photography and already cited above. It is, especially for the recording medium for H2, preferred that said recording medium is coated on a stripable temporary support.

In order to regulate the force necessary to strip said temporary support away, once that a volume reflection hologram, for use according to the present invention is laminated to a photostimulable panel, a stripping layer can be applied between said temporary support and said photosensitive medium for the recording of a volume reflection hologram for use according to the present invention.

Said stripping layer may be composed as disclosed in e.g. U.S. Pat. No. 4,482,625 and EP-A 529697.

When H1 is an outermost layer of the photostimulable phosphor panel according to the present invention it may be advantageous to have a protective layer on top of H1. Preferably, when a protective layer is desired, said protective layer is formed by the original support of the recording medium for said volume reflection hologram H1.

In another embodiment of the present invention, volume reflection hologram H1 is not an integral part of the photostimulable phosphor panel, but is incorporated in the apparatus for stimulating said photostimulable phosphor panel and for collecting the stimulated emission light by a light collecting means. In this case the volume reflection hologram H1 is mounted in said apparatus for stimulating said photostimulable phosphor panel and for collecting the stimulated emission light by a light collecting means in such a way that it is interposed between said photostimulable phosphor panel and said light collecting means and that it is not farther than 2 mm, preferably not farther than 200 μm, away from the surface of said photostimulable phosphor panel, facing said volume reflection hologram H1.

COMPARATIVE EXAMPLE

A photostimulable phosphor sheet comprising a photostimulable phosphor $Ba_{0.859}Sr_{0.14}Eu_{0.001}F_{1.11}Br_{0.89}$ and coated on black polyester is irradiated with X-ray of 70 kVp and 100 mAs. No hologram H1 was present.

After irradiation the stored X-ray energy is read out by stimulation with a He-Ne laser with 40 mA and the stimulated emission light detected with a light collecting means with opening angle ±30 degrees with respect to the normal on the surface of the photostimulable phosphor layer. The amount of collected stimulated emission light collected within the angle ±30 degrees was 100.

EXAMPLE

The procedure of the comparative example was repeated except for the presence of a hologram H1 on top of the photostimulable phosphor layer. The hologram H1 reflected 90% of the stimulating emission light reaching the interface between said photostimulable phosphor layer and said hologram H1 with an angle outside ±30 degrees with respect to the normal on the surface of photostimulable phosphor layer and transmited 90% of said stimulated emission light reaching the interface between said photostimulable phosphor layer and said hologram H1 with an angle within ±30 degrees with respect to the normal on the surface of photostimulable phosphor layer. The amount of collected stimulated emission light within the angle ±30 degrees was 120.

We claim:

1. A combination comprising
   (i) a supported or self supporting photostimulable phosphor pane, comprising a photostimulable layer, said phosphor being capable of storing energy upon irradiation with X-rays and of releasing said stored energy as stimulated emission light upon irradiation with stimulating light and
   (ii) collecting means for stimulated emission light, having a restricted angular aperture wherein
   (i) said combination further comprises a volume reflection hologram H1, situated between said phosphor panel and said light collecting means and
   (ii) said volume reflection hologram H1 reflects stimulated emission light entering said volume reflection hologram under any angle outside a restricted angle, determined by the angular aperture of said collecting means and transmits stimulated emission light entering said volume reflection hologram under said predetermined restricted angle.

2. A combination according to claim 1, wherein said volume reflection hologram, H1
   (i) reflects at least 80% of stimulated emission light entering said volume reflection hologram, H1 under any angle outside said predetermined restricted angle and
   (ii) transmits at least 80% of stimulated emission light entering said volume reflection hologram under said predetermined restricted angle.

3. A combination according to claim 1, wherein said volume reflection hologram H1 is situated between said phosphor panel and said light collecting means at a distance of not more than 2 mm from the surface of said phosphor panel.

4. A combination according to claim 1, wherein said volume reflection hologram H1 is situated between said phosphor panel and said light collecting means at a distance of not more than 200 μm from the surface of said phosphor panel.

5. A combination according to claim 1, wherein said volume reflection hologram H1 is applied to one side of said phosphor layer in such a way that said hologram H1 forms an integral part of said photostimulable phosphor panel 6. A combination according to claim 5, wherein said volume reflection hologram is an outermost layer.

7. A combination according to claim 6, wherein on top of said volume reflection hologram a protective layer is present.

8. A combination according to claim 1, wherein said photostimulable phosphor layer is supported by a reflecting support.

9. A combination according to claim 1, wherein said combination comprises further a volume reflection hologram H2, said volume reflection hologram H2
   (i) reflecting stimulated emission light entering said volume reflection hologram H2 under any angle and
   (ii) transmitting stimulating light entering said volume reflection hologram H2 under any angle, said volume reflection hologram H2 being situated on the side of said phosphor panel facing away from volume reflection hologram H1.

10. (Amended) A combination according to claim 3, wherein said reflection hologram H2 reflects at least 80% of stimulated emission light entering said volume reflection hologram H2 under any angle and transmits at least 80% of stimulating light entering said volume reflection hologram H2 under any angle.

11. A combination according to claim 9, wherein said phosphor panel comprises a support and said volume reflection hologram H2 is located between a support and said photostimulable phosphor layer.

12. A combination according to claim 11 wherein said support is capable of absorbing said stimulating light.

13. A combination according to claim 12, wherein said support comprises a pigment or dye or a mixture of pigments or dyes absorbing said stimulating light.

14. A photostimulable phosphor panel comprising a photostimulable phosphor layer, said phosphor being capable of storing energy upon irradiation with X-rays and of releasing said stored energy as stimulated emission light upon irradiation with stimulating light, wherein said panel comprises the following layers in consecutive order
   (i) a support, capable of absorbing stimulating light
   (ii) a volume reflection hologram H2 reflecting stimulated emission light entering said volume reflection hologram H2 under any angle and transmitting stimulating light entering said volume reflection hologram H2 under any angle,
   (iii) a stimulable phosphor layer,
   (iv) a volume reflection hologram H1 reflecting stimulated emission light entering said volume reflection hologram H1 under any angle outside a predetermined restricted angle and transmitting stimulated emission light entering said volume reflection hologram H1 under said predetermined restricted angle.

15. A method for recording a pattern of penetrating radiation comprising the steps of:
   (i) causing a photostimulable storage phosphor comprised in a stimulable phosphor layer of a supported or self-supporting phosphor panel to absorb penetrating radiation having passed through an object or emitted by an object thereby storing energy of said penetrating radiation in said phosphor
   (ii) stimulating said phosphor with an electromagnetic radiation beam (stimulating light) striking said phosphor to release energy, stored in said phosphor, as stimulated emission light,
   (iii) collecting said stimulated emission light by a collecting means, with a restricted angular aperture, wherein said stimulated emission light is caused (i) to emerge from said phosphor panel only with a restricted angle determined by said restricted angular aperture of said light collecting means and (ii) to be reflected into said phosphor layer outside said angle.

16. A method according to claim 15 wherein, a volume reflection hologram, H1, is present, said volume hologram, H1, (i) being positioned between said photostimulable phosphor layer (1) and said light collecting means, (ii) transmitting stimulated emission light arriving at the interface of said photostimulable phosphor layer and volume reflection hologram H1 under any angle within said restricted angle and (iii) reflecting stimulated emission light arriving at said interface under any angle outside said restricted angle.

17. A method according to claim 16, wherein said volume reflection hologram, H1, has (i) a transmittance of at least 80% for stimulated emission light arriving at the interface of said photostimulable phosphor layer (1) and said volume reflection hologram H1 under any angle within said restricted angle determined by said restricted angular aperture of said light collecting means and (ii) a reflectance of at least 80% for stimulated emission light arriving at said interface under any angle outside said restricted angle.

18. A method according to claim 15, wherein said photostimulable phosphor layer is coated onto a support and between said support and said stimulable phosphor layer a volume reflection hologram, H2, is interposed, said volume reflection hologram, H2, reflecting, independently of the angle of incidence, stimulated emission light and transmitting, independently of the angle of incidence, stimulating light.

19. A supported or self supporting photostimulable phosphor panel, comprising a photostimulable phosphor layer, capable of storing energy upon irradiation with X-rays and of releasing said stored energy as stimulated emission light upon irradiation with stimulating light, wherein said panel further comprises at least one volume reflection hologram H2, reflecting stimulated emission light entering said volume reflection hologram under any angle and transmitting stimulating light entering said volume reflection hologram under any angle.

* * * * *